(12) United States Patent
Terashima et al.

(10) Patent No.: US 7,845,260 B2
(45) Date of Patent: Dec. 7, 2010

(54) MITER SAW

(75) Inventors: Hideaki Terashima, Hitachinaka (JP); Shigeharu Ushiwata, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 79 days.

(21) Appl. No.: 11/682,972

(22) Filed: Mar. 7, 2007

(65) Prior Publication Data

US 2007/0214927 A1    Sep. 20, 2007

(30) Foreign Application Priority Data

Mar. 8, 2006    (JP)    ............................ P2006-062627

(51) Int. Cl.
    *B27B 5/26*    (2006.01)
(52) U.S. Cl. ............................ 83/471.3; 83/490; 83/473
(58) Field of Classification Search ................ 83/471.3, 83/473, 490
    See application file for complete search history.

(56) References Cited

U.S. PATENT DOCUMENTS

| | | | | |
|---|---|---|---|---|
| 2,146,777 | A | * | 2/1939 | Strong .......................... 30/519 |
| 4,152,961 | A | * | 5/1979 | Batson ....................... 83/471.3 |
| 4,219,899 | A | * | 9/1980 | Zurawin et al. ............. 15/144.2 |
| 4,694,720 | A | * | 9/1987 | Brickner et al. ............. 83/471.3 |
| 5,235,889 | A | * | 8/1993 | Brickner et al. ............. 83/471.3 |
| 5,265,511 | A | * | 11/1993 | Itzov ........................... 83/490 |
| 5,425,294 | A | * | 6/1995 | Ushiwata et al. ........... 83/471.3 |
| 6,044,740 | A | * | 4/2000 | Werkheiser ................ 83/436.2 |
| 6,470,778 | B1 | * | 10/2002 | Kaye et al. ..................... 83/100 |
| 6,474,206 | B1 | * | 11/2002 | Brunson ..................... 83/471.3 |
| 6,513,412 | B2 | * | 2/2003 | Young ........................ 83/471.3 |
| 6,550,363 | B2 | * | 4/2003 | He ............................. 83/471.3 |
| 6,810,780 | B2 | * | 11/2004 | Ceroll et al. ............... 83/471.3 |
| 6,886,440 | B2 | | 5/2005 | Parks et al. |

(Continued)

FOREIGN PATENT DOCUMENTS

CN    1579609 A    2/2005

(Continued)

OTHER PUBLICATIONS

Office Action for corresponding Taiwan patent application No. 96107980 dated May 22, 2009.

(Continued)

*Primary Examiner*—Jason Daniel Prone
*Assistant Examiner*—Jennifer Swinney
(74) *Attorney, Agent, or Firm*—Antonelli, Terry, Stout & Kraus, LLP.

(57) ABSTRACT

A miter saw has a base, a turntable, a cutting unit, and a support unit. The base supports a workpiece thereon. The base has an rotation center. The turntable is supported by the base and rotatable about the rotation center. The cutting unit rotatably supports a saw blade. The support unit is provided to the turntable for pivotally movably supporting the cutting unit over the turntable. The turntable has: a main body and an extension member. The main body is provided with an outer periphery and an upper surface having an imaginary line onto which the saw blade is pivoted down. The extension member extends outwardly from the outer periphery in a first direction of the imaginary line for rotating the main body. The extension member is movable with respect to the main body.

11 Claims, 10 Drawing Sheets

U.S. PATENT DOCUMENTS

| | | | |
|---|---|---|---|
| 6,971,297 B1 * | 12/2005 | Meredith et al. | 83/478 |
| 6,971,298 B2 * | 12/2005 | Ushiwata et al. | 83/581 |
| 7,121,179 B2 * | 10/2006 | Chen | 83/522.16 |
| 7,201,090 B2 * | 4/2007 | Svetlik et al. | 83/471.3 |
| 2002/0144582 A1 | 10/2002 | He et al. | |
| 2003/0200852 A1 * | 10/2003 | Romo | 83/473 |
| 2004/0074362 A1 * | 4/2004 | Svetlik et al. | 83/473 |
| 2005/0235791 A1 | 10/2005 | Ushiwata et al. | |
| 2006/0266184 A1 * | 11/2006 | Hetcher et al. | 83/471.3 |
| 2007/0022853 A1 * | 2/2007 | Carroll et al. | 83/34 |

FOREIGN PATENT DOCUMENTS

| | | |
|---|---|---|
| CN | 1593825 A | 3/2005 |
| CN | 1672844 | 9/2005 |
| CN | 2723154 Y | 9/2005 |
| DE | 20 2004 004 929 U1 | 7/2004 |
| EP | 1614492 A1 | 1/2006 |
| JP | 7-67809 | 3/1995 |
| JP | 7-256602 | 10/1995 |
| JP | 2001-197801 | 7/2001 |
| JP | 2002-200601 | 7/2002 |
| JP | 2004-092737 | 3/2004 |
| JP | 2005-279933 | 10/2005 |
| JP | 2006-35608 A | 2/2006 |
| TW | 564210 | 9/1991 |
| TW | M270903 | 1/2007 |

OTHER PUBLICATIONS

Japanese Office Action; Application No. JP 2006-062627 dated Dec. 22, 2009.

* cited by examiner

MITER SAW

TECHNICAL FIELD

The present invention relates to a miter saw, and particularly to a miter saw having a turntable.

BACKGROUND ART

In a conventional miter saw, a turntable is provided to cut a wooden workpiece placed on a base to be processed at a given angle. The turntable is provided with a support unit which movably supports a cutting unit with a cutting blade. And, the turntable is rotatable with respect to the base.

To rotate the turntable, an extension member extending outwardly from the turntable is provided at a front position of the miter saw (e.g., on an operator's side of the miter saw). Further, a handle for rotating the turntable is provided to the extension member (see Japanese Patent Application No. 2004-092737).

Miter saws of the above type are frequently carried to various working areas in order to process wooden workpieces. Therefore, downsizing of the miter saw has been promoted so that the miter saws are becoming compact from points of portability.

However, the conventional miter saws have a structure in which the handle protrudes outwardly from a front side of the turntable or the base. Therefore, the handle often hinders portability when the miter saw is carried. Further, when the miter saw is packed, for example, when the miter saw is put in a cardboard box, an unnecessarily large packing box is required because protrusion of the handle enlarges a vertically projected area of the machine.

SUMMARY

The present invention is to provide a miter saw which allows downsizing and facilitates transportation.

The present invention provides a miter saw having a base, a turntable, a cutting unit, and a support unit. The base supports a workpiece thereon. The base has an rotation center. The turntable is supported by the base and rotatable about the rotation center. The cutting unit rotatably supports a saw blade. The support unit is provided to the turntable for pivotally movably supporting the cutting unit over the turntable. The turntable has: a main body and an extension member. The main body is provided with an outer periphery and an upper surface having an imaginary line onto which the saw blade is pivoted down. The extension member extends outwardly from the outer periphery in a first direction of the imaginary line for rotating the main body. The extension member is movable with respect to the main body.

BRIEF DESCRIPTION OF THE DRAWINGS

The particular features and advantages of the invention as well as other objects will become apparent from the following description taken in connection with the accompanying drawings, in which.

DETAILED DESCRIPTION

The next description will be made for explaining a miter saw according to embodiments of the present invention, referring to the drawings. In the following description, the expressions "front", "rear", "above", "below", "right", and "left" are used throughout the description to define the various parts when the miter saw is disposed in an orientation in which it is intended to be used.

Figure 1:
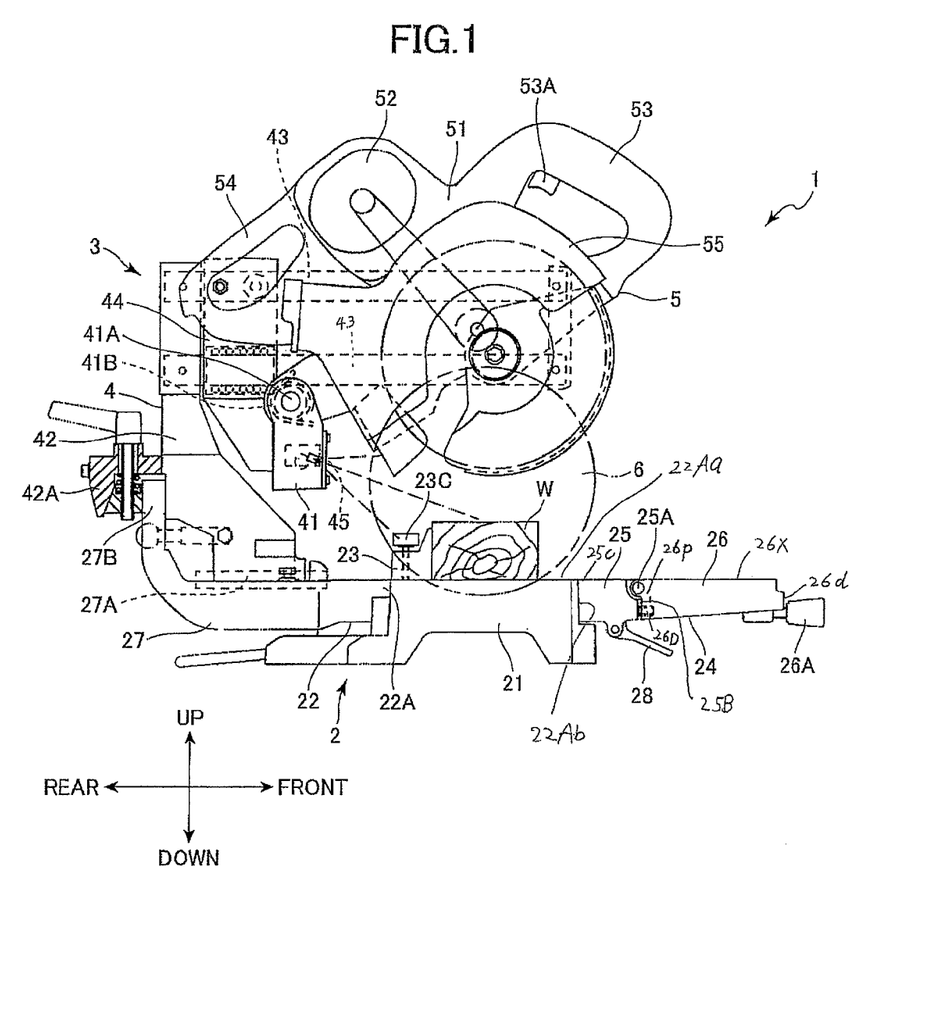
FIG. 1 is a side view of a miter saw according to a first embodiment of the present invention.

The first embodiment of the present invention will be described with reference to FIGS. 1 to 8. FIG. 1 shows a miter saw 1 having a slide mechanism. The miter saw 1 has a base portion 2, a cutting portion 3, and support portion 4.

Figure 2:
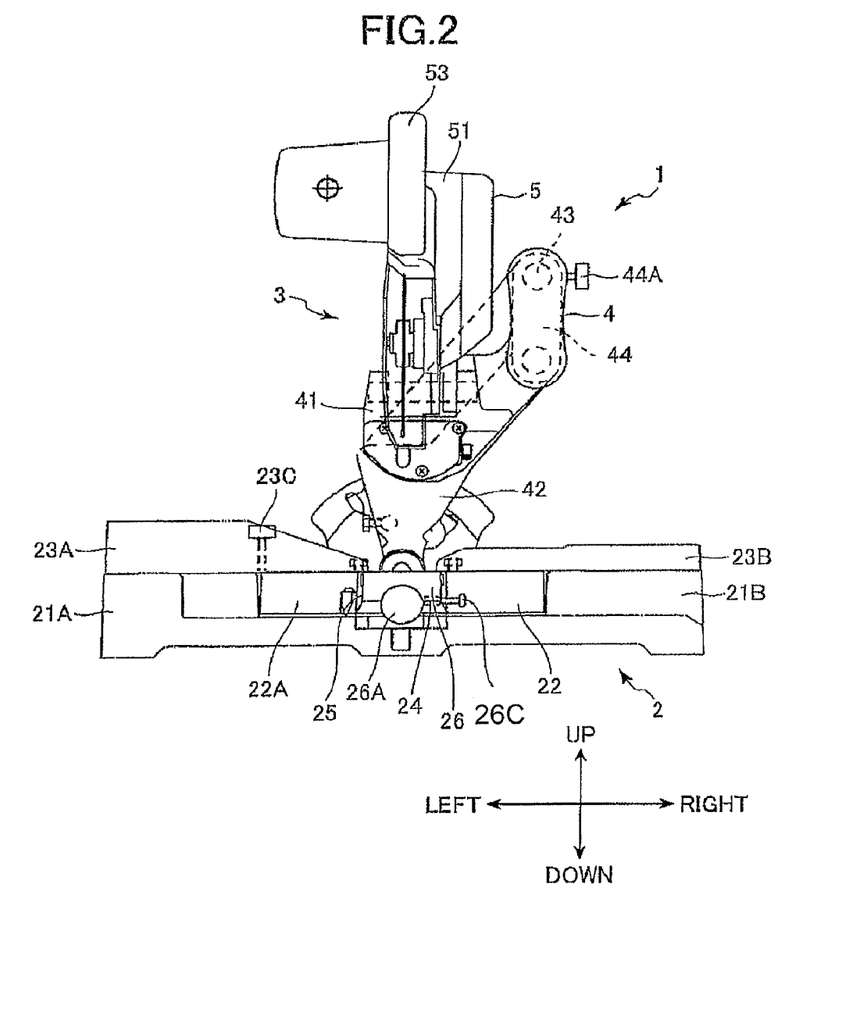
FIG. 2 is a front view of the miter saw according to the first embodiment of the invention.
Figure 3:
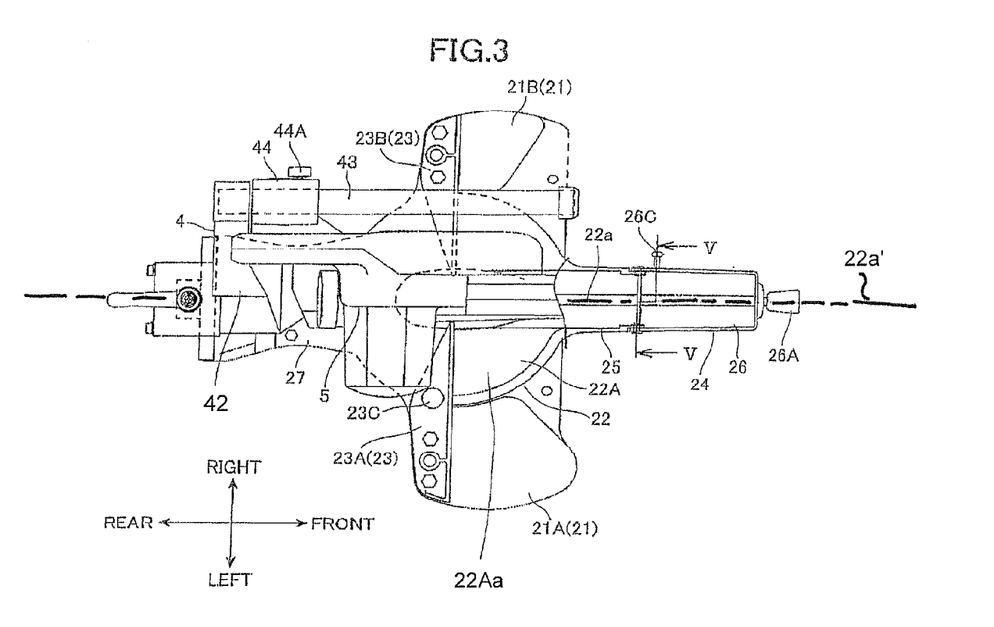
FIG. 3 is a plan view of the miter saw according to the first embodiment of the invention.
Figure 6:
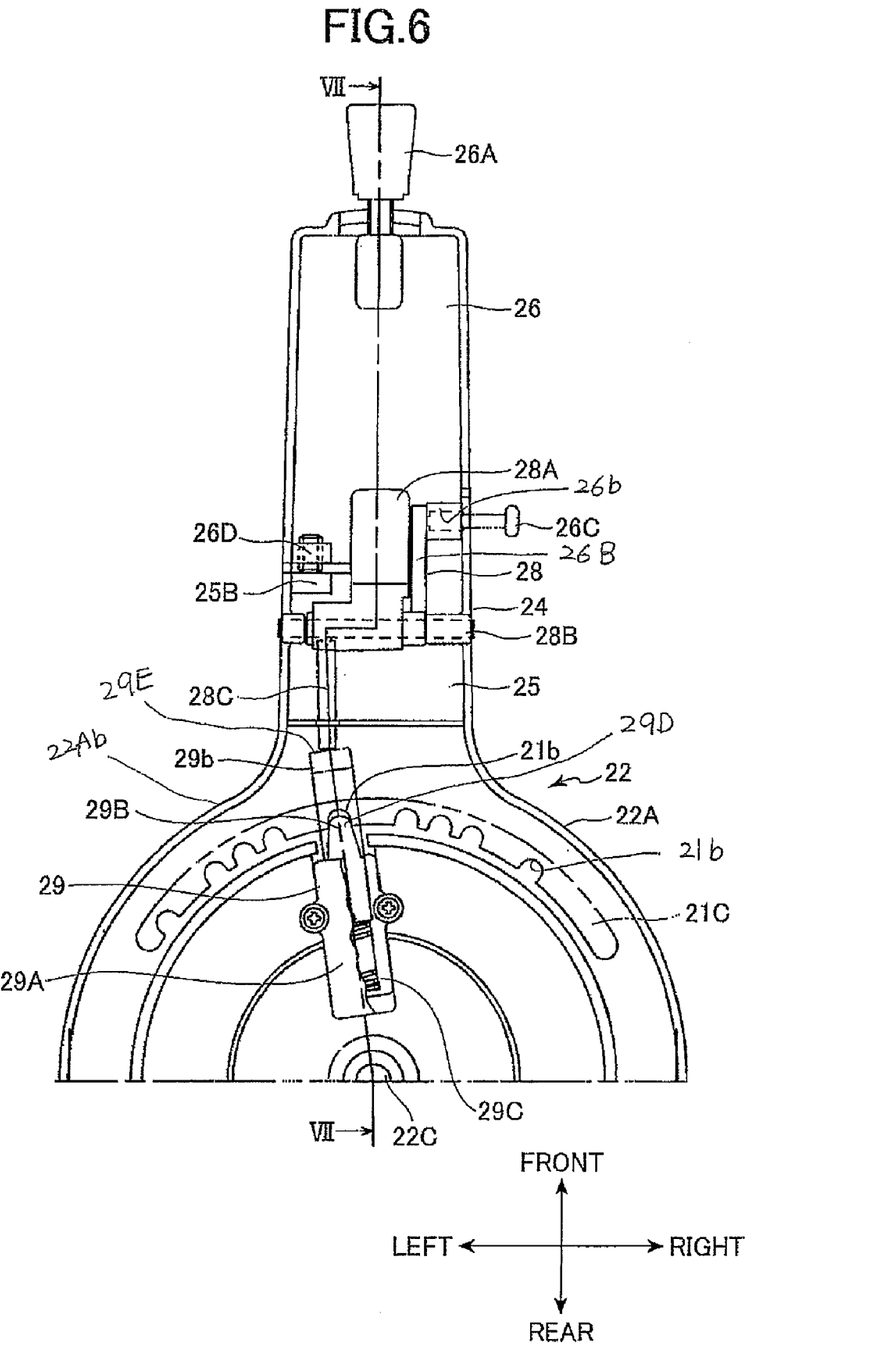
FIG. 6 is a bottom view showing a turntable in the miter saw according to the first embodiment of the invention.

The base portion 2 is constituted by a base 21, a turntable 22, and a fence 23. The base 21 carries a wooden workpiece W to be cut thereon. The turntable 22 is pivotably provided in and supported to the base 21. The fence 23 is provided on the base 21. As shown in FIGS. 2 and 3, the base 21 is divided into a left base 21A and a right base 21B. The direction along which the left and right bases 21A and 21B are arranged is hereinafter defined as a lateral direction. As shown in FIG. 6, a regulation member 21C is provided in the base 21. The regulation member 21C is formed in an arcurate shape centered on a center axis 22C, which is a rotation center of the turntable 22. A plurality of concaves 21b are formed in the regulation member 21C at predetermined angular intervals.

The turntable 22 is located between the right base 21B and the left base 21A. As shown in FIG. 1, the turntable 22 is constituted by: a main-body 22A, an extension unit 24, and a support portion 27. The main-body 22A has a shape like a substantially circular table with an upper surface 22Aa and an outer periphery 22Ab. The extension unit 24 extends outwardly from the outer periphery 22Ab of the main-body 22A. The support portion 27 is provided on the other side of the extension unit 24 with respect to the rotation center 22c.

As shown in FIG. 3, a straight groove 22a is formed in the upper surface 22Aa (FIG. 1) of the turntable 22, extending from the support portion 27 to the extension unit 24. The groove 22a is formed at the same position as an imaginary straight line 22a', FIGS. 1 and 3, on which a circular saw blade 6 of the cutting portion 4 is pivoted down. The groove 22a receives a cutting edge of the circular saw blade 6. It is noted that the groove 22*a* is aligned with and parallel to the extending direction of the extension unit 24.

As shown in FIG. 1, the extension unit 24 is constituted by a mount member 25 integrated with the main-body 22A, and an extension member 26. The extension member 26 is pivotally supported about a shaft 25A to the mount member 25. The shaft 25A is provided at a distal end of the mount member 25 under an upper surface 25*c* thereof. And, the shaft 25A is provided so that an axis thereof is substantially perpendicular to the extending direction of the extension unit 24 and parallel to an upper face 25*c* of the mount member 25. An operating unit or operation member 28 (FIG. 1) is provided in a lower portion of the mount member 25 and used for regulating rotary movement of the turntable 22 with respect to the base 21. The mount member 25 has an contact wall 25B which is substantially perpendicular to the upper surface 25*c* of the mount member 25.

Figure 7:
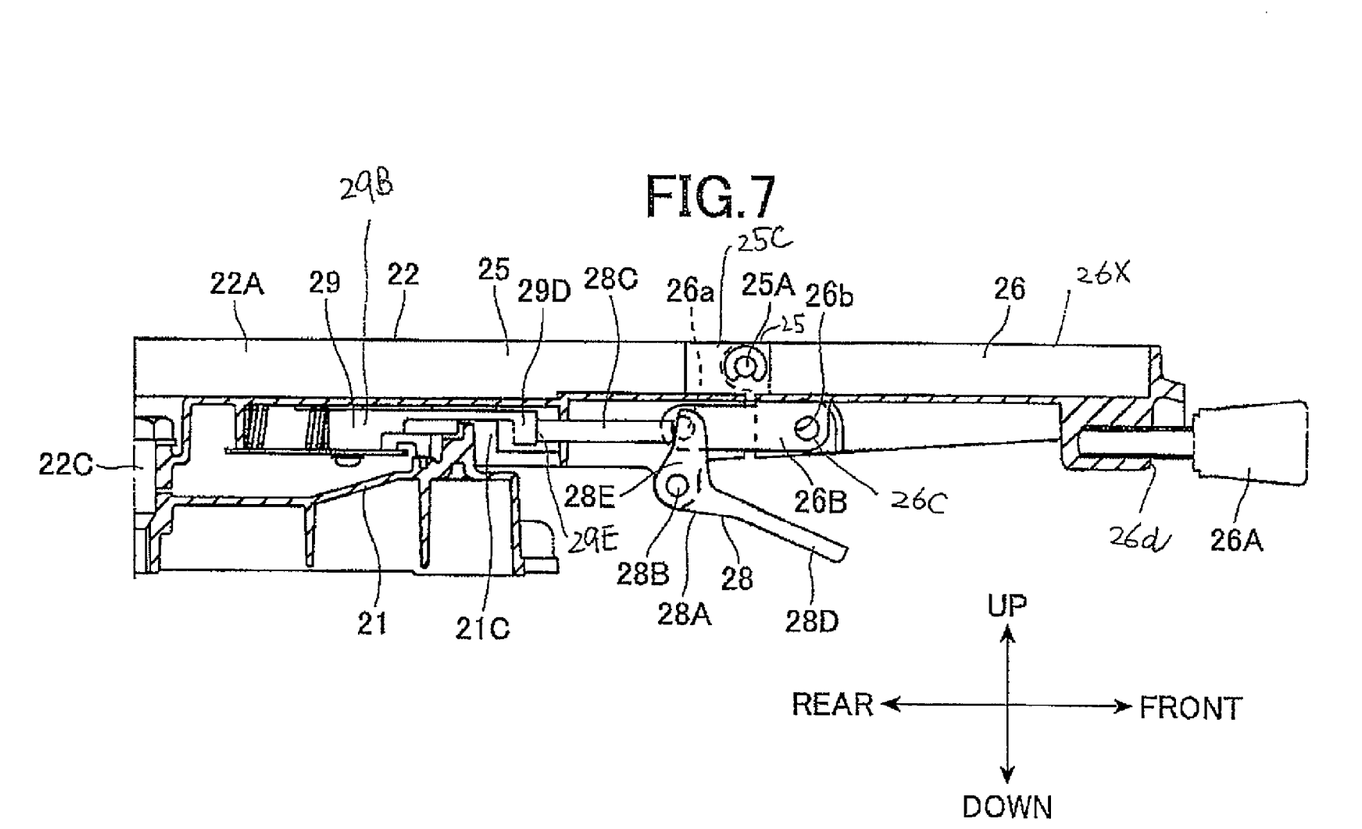
FIG. 7 is a cross-sectional view taken along lines of VII-VII in FIG. 6.

As shown in FIG. 7, the operating unit 28 is constituted by: a regulation lever 28A which is L-shaped in side view, a shaft 28B, and a transmission member 28C which transmits pivot of the regulation lever 28A to an engaging mechanism 29. The shaft 28B extends in a substantially perpendicular direction to the extending direction of the extension unit 24. The shaft 28B supports the regulation lever 28A pivotally. The regulation lever 28A is constituted by a first arm 28D and a second arm 28E integral with the first arm 28D to form an L-shape. The regulation lever 28A is pivotally supported to the shaft 28B at a joint of the first arm 28D and the second arm 28E. The first arm 28D is positioned below the mount member 25 and operable by an operator. One end of the second arm 28E contacts one end of the transmission member 28C. Pivot of the first arm 28D urges the second arm 28E to abut the transmission member 28C. The transmission member 28C is movably held by the mount member 25 so as to move in the radial direction of the main body 22A. Accordingly, the movement of the second arm 28E is transmitted to the engaging mechanism 29.

As shown in FIG. 6, the engaging mechanism 29 is provided in the turntable 22 for being engaged with the regulation member 21C. The engaging mechanism 29 is constituted mainly by a frame 29A, a slide member 29B, and a spring 29C. The slide member 29B and the spring 29C are contained in the frame 29A. The slide member 29B has an elongated shape and is slidable in a longitudinal direction by the spring 29C. As shown in FIG. 7, the slide member 29B has a convex portion 29D and a contact portion 29E which is abutable with the transmission member 28C. The slide member 29B is slidable, as the contact portion 29E is pressed by the transmission member 28C. Accordingly, the convex portion 29D can be detachably engaged to one of the concaves 21*b*. As a result, when the convex portion 29D is engaged with one of the concave portions 21*b*, the turntable 22 is immovably fixed and secured to the base 21.

A secure mechanism 26B is provided in a proximal end of the extension member 26 for positioning and securing the extension member 26 to the mount member 25. The extension member 26 has a first hole 26*a* and a second hole 26*b* which are selectively engaged with a pin 26C.

As shown in FIGS. 1 and 7, the extension member 26 is pivotally supported by the shaft 25A to be pivotable upward about the shaft 25A as a fulcrum. As shown in FIG. 1, a handle 26A is provided at a distal end portion 26*d* of the extension member 26, and serves as a grip used for rotating the turntable 22. A screw 26D is provided in the proximal end surface 26*p* of the extension member 26 facing the contact wall 25B. The screw 26D is threadably engaged to the proximal end surface 26*p*, so that a projecting length of the screw 26D from the proximal end surface 26*p* is changeable. Accordingly, the contact wall 25B and the screw 26D constitute a pivot angle adjustment mechanism to finely adjust a pivot angle of the extension member 26 with respect to the mount member 25, depending on the projecting length of the screw 26D from the proximal end surface 26*p*. Accordingly, the upper surface 25*c* of the mount member 25 is flush with the upper surface 26X of the extension member 26.

Figure 5:
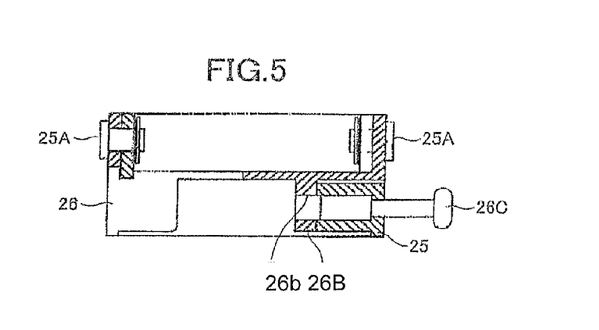
FIG. 5 is a cross-sectional view taken along lines of V-V in FIG. 3.

As shown in FIGS. 2 and 5, the pin 26C is provided in a proximal end portion of the mount member 25 to be movable in a direction perpendicular to the extending direction of the extension member 26. The pin 26C is selectively engaged in the first hole 26*a* and the second hole 26*b*. More specifically, as shown in FIG. 7, when the pin 26C is inserted into the second hole 26*b*, an upper surface 26X of the extension member 26 is substantially flush with the upper surface 25*c* of the mount member 25. In this case, when the projecting length of the screw 26D from the proximal end surface 26*p* is changed, the pivot angle of the extension member 26 with respect to the mount member 25 is adjusted, so that the flushness of the extension member 26 with respect to the mount member 25 is improved and enhanced.

Figure 8:
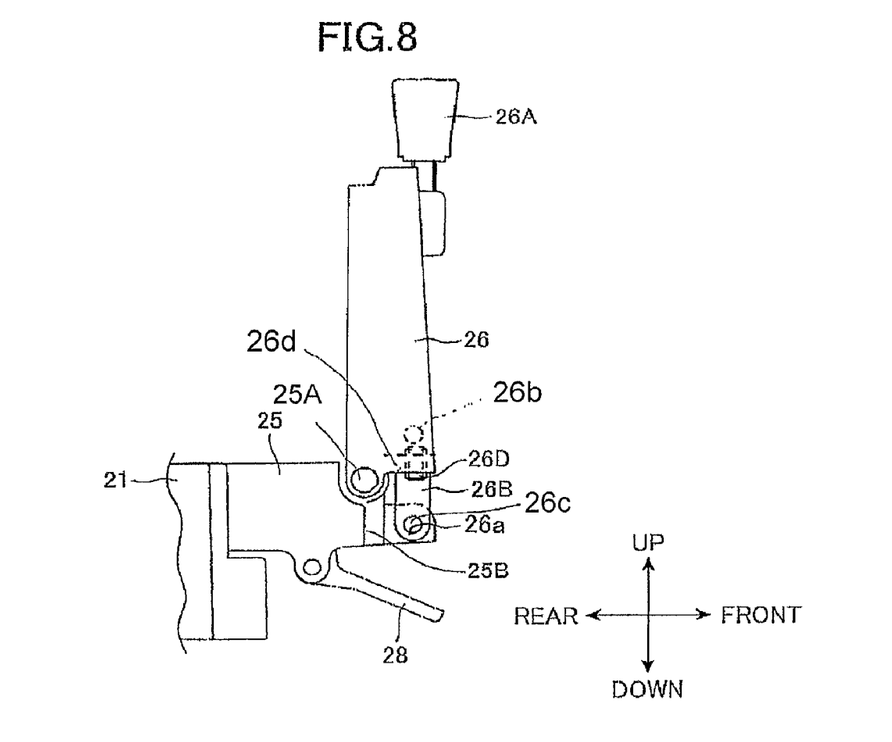
FIG. 8 is a side view showing an extension unit with the total horizontal length thereof being shortened.

On the other hand, as shown in FIG. 8, when the pin 26C is inserted into the first hole 26*a* instead of the second hole 26*b*, the longitudinal direction of the extension unit 24 is oriented substantially at right angles to the extending direction of the mount member 25. In other words, when the pin 26C is inserted into the first hole 26*a*, the distance between the distal end portion 26*d* and the proximal end portion 26*p* in a horizontal direction is shortened, that is the length of the miter saw in the first direction is shortened compared with the distance between the distal end portion 26*d* and the proximal end portion 26*p* when the mount member 25 is flush with the extension member 26.

As shown in FIG. 1, the support portion 27 is positioned on the opposite side of the extension unit 24 with respect to the rotation center 22C. The support portion 27 has a tilt shaft 27A positioned on an extending line from the groove 22*a* (FIG. 3), and a tilt support portion 27B for supporting the cutting portion 3 at a fixed tilt angle.

As shown in FIG. 1, the fence 23 is provided on the base 21. As shown in FIGS. 2 and 3, the fence 23 is constituted by a left fence 23A and a right fence 23B corresponding to the left base 21A and the right base 21B, respectively. Front surfaces of the left fence 23A and right fence 23B are aligned to each other and positioned substantially in a common plane to define the position of the wooden workpiece W (FIG. 1). Further, as shown in FIG. 2, a fixing screw 23C is screwed in the left fence 23A and over the turntable body 22A. As the fixing screw 23C is screwed down, the screw 23C is moved downward to abut the main body 22A. Accordingly, rotation of the turntable 22 with respect to the base 21 is restricted.

As shown in FIG. 1, the cutting portion 3 is supported by the support portion 4. The support portion 4 is constituted mainly by a pivot support unit 41, a slide support unit 42, a pair of slide bars 43, and a slide member 44. The slide support unit 42 is tiltably supported about the tilt shaft 27A by the turntable 22, so that the slide support unit 42 can be tilted substantially in lateral directions with respect to the groove 22*a*. A tilt fixing mechanism 42A is provided at a rear end portion of the slide support unit 42 to cooperate with the tilt support portion 27B. Accordingly, the tilt fixing mechanism 42A defines a tilt angle of the cutting portion 3 with respect to the base 21 and the turntable 22.

The pair of slide bars 43 are arranged in a vertical direction above the slide support unit 42, and axes of the slide bars 43 extend substantially parallel to the groove 22*a* (FIG. 3). The slide member 44 is provided to be slidable along the slide bars 43. A screw 44A is provided in a side face of the slide member 44 (FIG. 3) and enables the slide member 44 to be fixed to a given position of the slide bars 43.

The pivot support unit 41 is formed integrally with the slide unit 44. A pair of arms spaced to each other in the lateral direction are formed at an upper portion of the pivot support unit 41. A pivot shaft 41A is provided between the pair of arms to pivotally support the cutting main unit 5. A spring 41B is provided about the pivot shaft 41A and urges the cutting main unit 5 upward with respect to the pivot support unit 41. A laser generator 45 which generates a laser beam pointing a cutting position on a wooden workpiece W is provided in a front surface of the pivot support unit 41.

As shown in FIG. 1, the cutting main unit 5 includes a motor 52 in a housing 51, a handle 53, a transport handle 54, and a saw blade cover 55 provided to the housing 51. The cutting main unit 5 rotatably supports the circular saw blade 6 which is partially covered by the saw blade cover 55. The housing 51 is pivotally supported to the pivot shaft 41A, and is urged upward by the spring 41B. The motor 52 drives and rotates the circular saw blade 6. The handle 53 is provided at an upper portion of the housing 51 to serve as a grip used for pivoting down the cutting main unit 5 for cutting operation. The handle 53 is provided with a switch 53A for controlling rotation of the motor 52. The transport handle 54 is provided at the rear portion of the saw blade cover 55, and is gripped by the operator when the miter saw 1 is moved for transportation. When the miter saw 1 is moved for transportation, the cutting main unit 5 is pivoted down to a lowermost position and secured by a pin (not shown) in this manner. The saw blade cover 55 is provided integrated with the housing 51 and partially covers the circular saw blade 6 for the sake of protecting.

Figure 4:
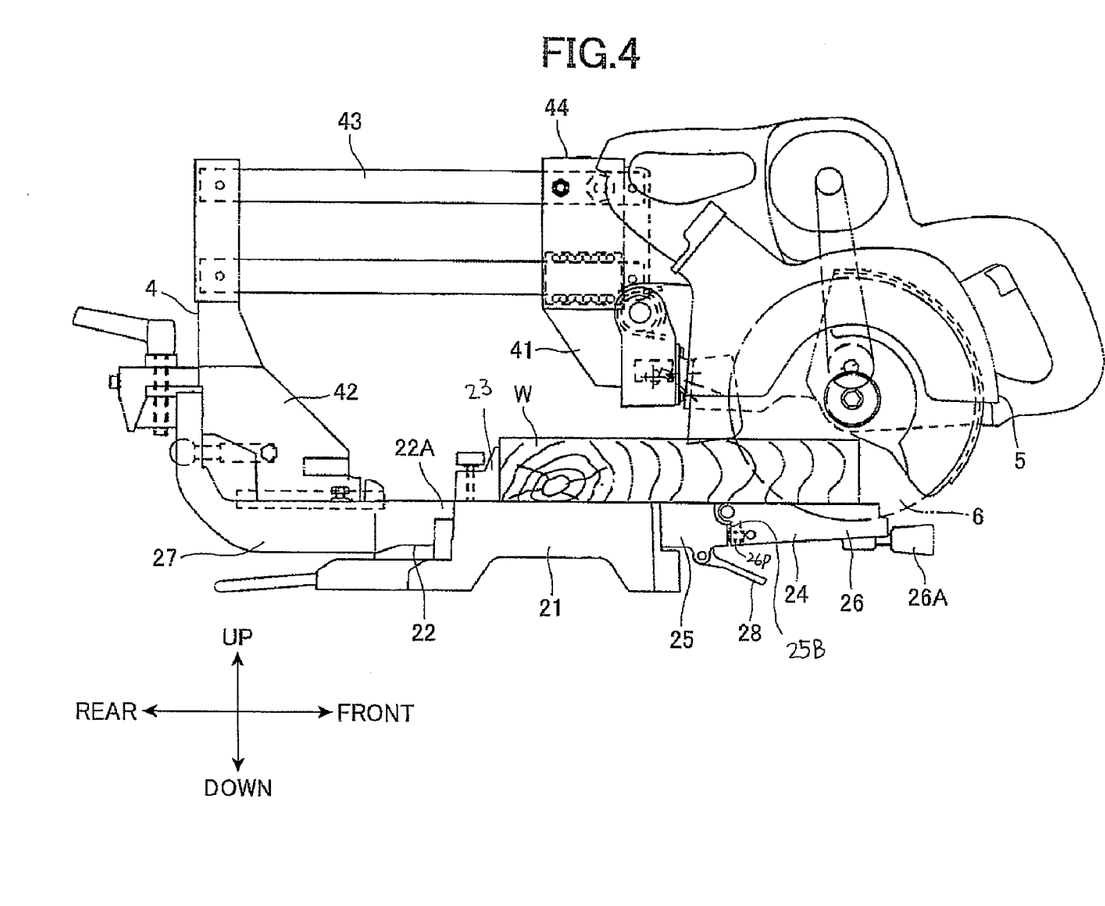
FIG. 4 is a side view of the miter saw according to the first embodiment of the invention.

When the wooden workpiece W is cut by the miter saw 1 having the above structure, the extension member 26 is pivoted down about the shaft 25A to be developed in the horizontal direction. At this time, the projecting length of the screw 26D is adjusted in order that the upper surface 25c of the mount member 25 is flush with the upper surface 26X of the extension member 26. Thereafter, the extension member 26 is secured to the mount member 25 by inserting the pin 26C to the second hole 26b, that is, by means of the secure mechanism 26B. Further, as shown in FIG. 1 or 4, the wooden workpiece W is placed on the base 21, and the rotation angle of the turntable 22 with respect to the base 21 is adjusted. At this time, the fixing screw 23C is loosened, and the regulation lever 28A is pushed up to release engagement between the concave 21b and the convex portion 29D. The fixing screw 23C is then tightened to secure the turntable 22 with respect to the base 21, after setting a predetermined rotation angle determined by engagement of the convex portion 29D into one of the concaves 21b.

If the wooden workpiece W has a small length in the forward and backward directions, as shown in FIG. 1, the cutting operation is carried out by pivoting the cutting main unit 5 down, while the slide member 44 is fixed to the rearmost position of the slide bars 43.

In another case, if the wooden workpiece W has a larger length in the forward and backward directions, as shown in FIG. 4, the cutting main unit 5 is moved to the forefront position of the slide bars 43, and the motor is then turned ON through the switch 53A to rotate the circular saw blade 6. The cutting main unit 5 is pivoted down to start cutting the workpiece W, while maintaining rotation of the circular saw blade 6. The cutting main unit 5 is then moved backward to the rearmost position of the slide bars 43, while maintaining rotation of the saw blade 6. In this case, a front portion of the wooden workpiece W is carried on the protruding portion 24, and supported together with the fence 23 reliably. Therefore, the wooden workpiece W can be cut precisely.

When the miter saw 1 is stored or moved to somewhere, the cutting main unit 5 is slid to the rearmost position of the slide bars 43, the pin 26C is released from the second hole 26b, and the extension member 26 is pivoted upward about the shaft 25A, as shown in FIG. 8. Then, the pin 26C is inserted into the first hole 26a so that the extension member 26 is secured in an upright posture with respect to the mount member 25. Therefore, the extension member 26 is prohibited from being pivoted downward. Accordingly, the distance from the tilt fixing mechanism 42A to the extension member 26 in the horizontal direction becomes the horizontal length of the miter saw 1 in the forward and backward direction. Thus, the miter saw 1 which is out of use can become compact, compared with the miter saw 1 in use.

Next, a second embodiment of the invention will be described with reference to FIGS. 9 to 12. A miter saw 101 according to the second embodiment has a common structure to the miter saw 1 of the first embodiment except for an extension unit. Therefore, the description of the common structure, which are designated by the same reference numbers of the first embodiment, will be omitted.

Figure 9:
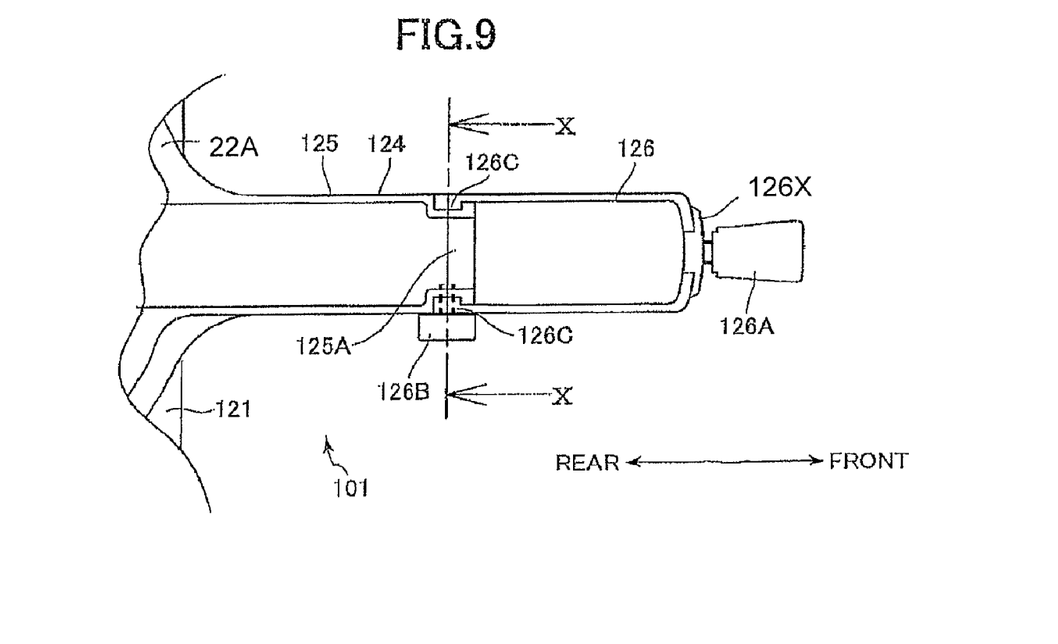
FIG. 9 is a plan view showing the extension unit with the extension member being secured to the mount member for a cutting operation.
Figure 11:
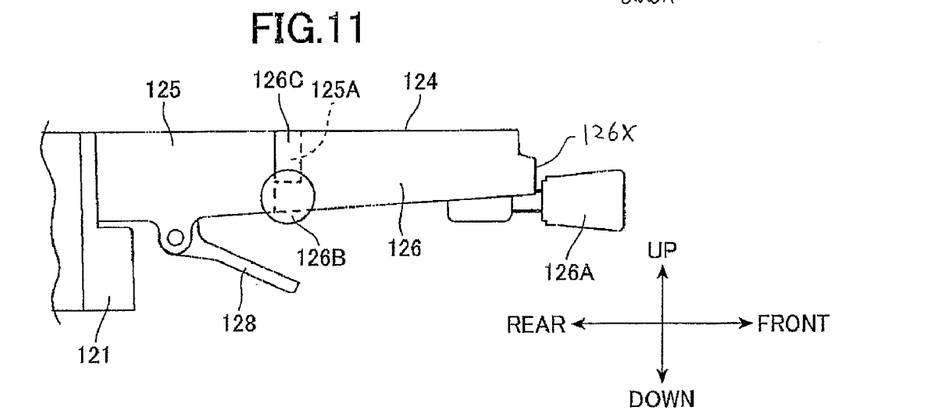
FIG. 11 is a side view showing an extension unit of the second embodiment according to the invention.

As shown in FIG. 9, an extension unit 124 is constituted by a mount member 125 and an extension member 126. The mount member 125 extends from an outer periphery of a main body 22A of a turntable 22. The extension member 126 is detachably connected to a distal end portion of the mount member 125 in the extending direction of the extension unit 124. As shown in FIGS. 9 and 11, a handle 126A is provided at a distal end portion 126X of the extension member 126. A screw 126B is provided at a connection portion of the mount member 125 and the extension member 126. A pair of arms 126C each of which has a substantially hook shape are provided in a proximal end portion of the extension member 126 facing the mount portion 125. An engagement portion 125A having a pair of grooves on each side is provided in a distal end portion of the mount member 125 facing the extension portion 126. As shown in FIG. 11, the engagement portion 125A is engaged with the pair of arms 126C, so that the mount member 125 is connected to the extension member 126.

Figure 10:
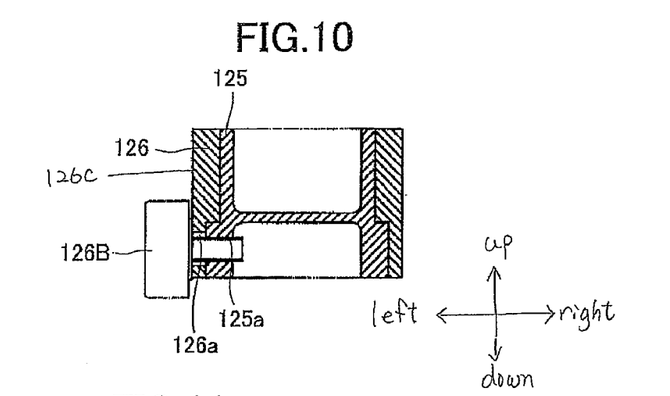
FIG. 10 is a cross-sectional view of the extension unit taken along lines of X-X in FIG. 9.
Figure 12:
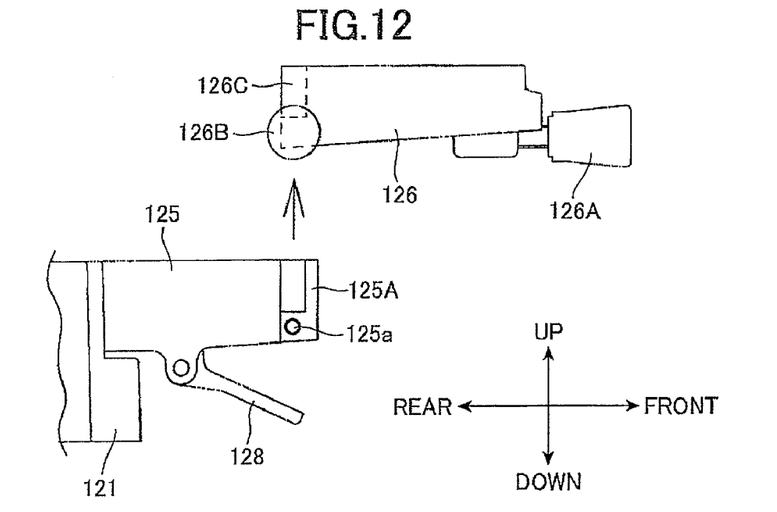
FIG. 12 is a side view showing the extension unit with the extension member being separated from the mount member.

As shown in FIG. 12, a screw hole 125a is formed in a side surface of the mount member 125. As shown in FIG. 10, a hole 126a is formed in a left side surface of the arm 126C facing the screw hole 125a. After the extension member 126 is engaged with the mount member 125 by means of the grooves, the extension member 126 can be secured and fixed to the mount member 125 by screwing a screw 126B into the screw hole 125a through the hole 126a.

To store or move the miter saw 101, the screw 126B is unscrewed so that the engagement portion 125A is disengaged from the pair of arms 126C, as shown in FIG. 12. In this manner, the extension member 126 can be detached from the mount member 125. Accordingly, the length of the miter saw 101 in forward and backward directions can be defined by a distal end portion of the mount member 125 and shortened. Accordingly, the miter saw 101 which is out of use can be more compact than the miter saw 1 in use.

Next, a third embodiment of the invention will be described with reference to FIGS. 13 to 15. A miter saw 201 of the third embodiment has the common structure to the miter saw 1 of the first embodiment except for an extension unit 224. Therefore, description of the common structure will be omitted.

Figure 13:
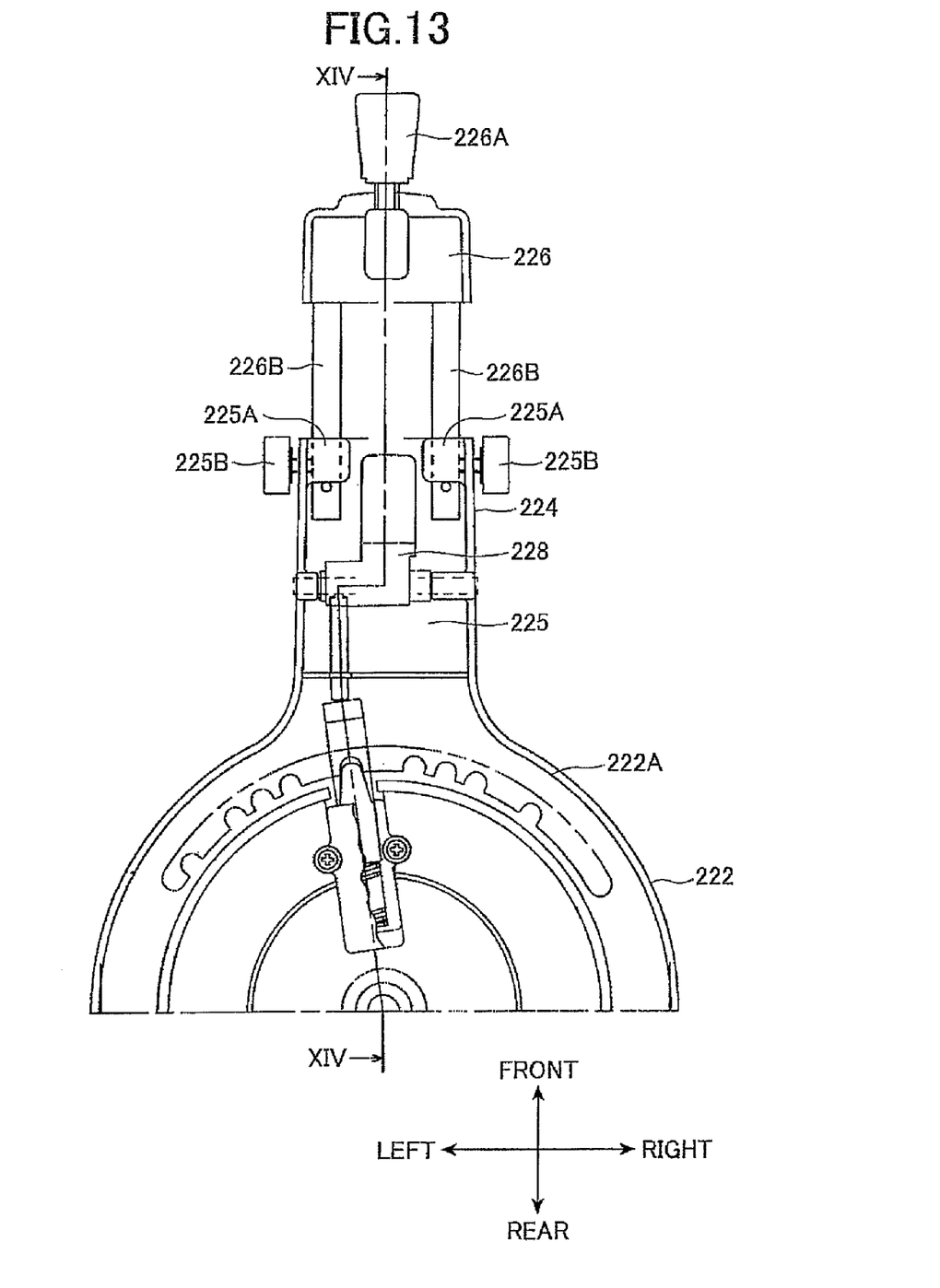
FIG. 13 is a bottom view showing a turntable and the extension unit of the third embodiment according to the invention.

As shown in FIG. 13, the extension unit 224 is constituted by a mount member 225 and an extension member 226. The mount member 225 extends from the outer periphery of the main body 222A. The extension member 226 is connected to a distal end of the mount member 225 in the radial direction of the main body 22A. A handle 226A is provided at a distal end portion of the extension member 226. A pair of slide bars 226B are provided substantially parallel to the extending direction of the extension unit 224 from the proximal end portion of the extension member 226 facing the mount member 225.

A pair of support portions 225A are provided at the distal end portion of the mount member 225 facing the extension member 226 for supporting the slide bars 226B. Holes are formed in the pair of support portions 225A, respectively, for receiving and slidably supporting the slide bars 226B. Screw holes are formed in the both side surfaces of the support portions 225A, respectively, for receiving screws 225B screwed therein. When the screws 225B are screwed in the screw holes, tip ends of the screws 225B are protruded through the holes formed in the support portions 225A.

Figure 14:
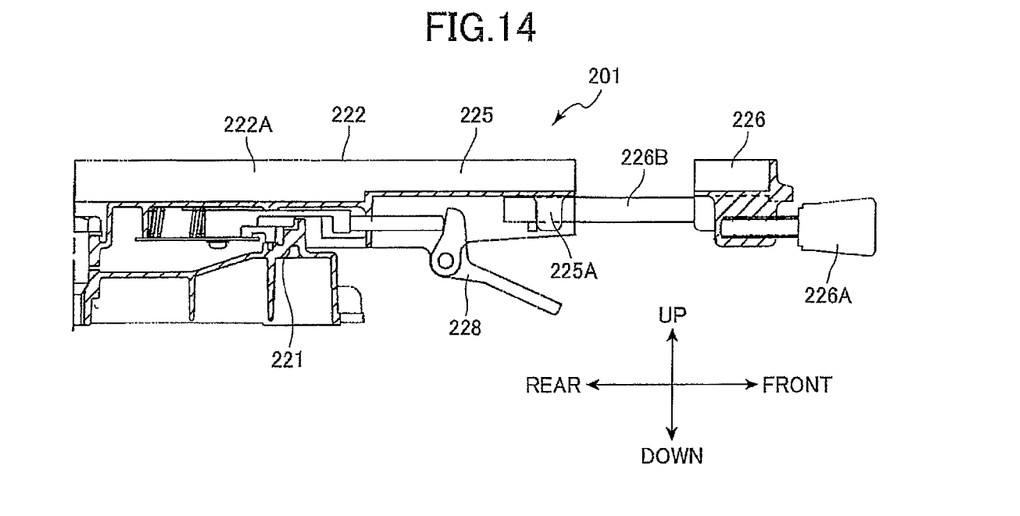
FIG. 14 is a cross-sectional view of the turntable and the extension unit taken along lines of XIV-XIV in FIG. 13.
Figure 15:
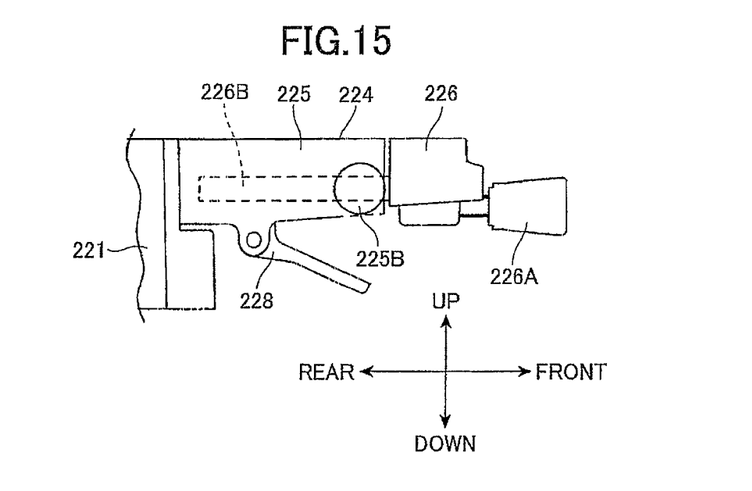
FIG. 15 is a side view showing the extension unit of the third embodiment according to the present invention.

When cutting work is carried out with the miter saw 201, the extension member 226 is first separated away from the mount member 225 by sliding the slide bars 226B with respect to the mount member 225, as shown in FIGS. 13 and 14. The screws 225B are then tightened to fix the slide bars 226B to the mount member 225, thereby prohibiting any movement of the extension member 226 with respect to the mount member 225.

If the miter saw 201 is stored after the cutting work, the extension member 226 is moved to contact the mount member 225 by sliding the slide bars 226B to the mount member 225. As a result, the total protrusion length of the extension unit 224 from the main body 22A, i.e., the horizontal length of extension unit 224 is shortened so that portability of the miter saw 201 is improved.

Miter saws according to the invention are not limited to the embodiments described above. However, various changes and modifications would be made within the scope of claims of the present invention. For example, the first to third embodiments have been described with reference to a miter saw having the cutting portion body which is configured to slide forward and backward. However, the invention is applicable to a miter saw having a non-slidable cutting portion, as far as the miter saw has a similar extension unit. Further, the present invention is applicable to a miter saw in which a pivot support unit is integral with the slide bars so that the cutting portion 3 is movable with respect to the support portion 4 together with the pivot support unit 41 and the slide bars 43.

In the first embodiment, the upper surface of the mount member is adjusted to be flush with the upper surface of the extension member by the pivot angle adjustment mechanism. Likewise, the miter saw of the second and third embodiments may have a mechanism for adjusting the upper surface of the extension member to the upper surface of the mount member.

The miter saw of the first to third embodiments may be provided with a safety mechanism to prohibiting a motor from activating when the extension member is not fixed or secured to the mount member in order to enhance security of the miter saw. For example, a switch for shutting off power supply to the motor may be provided.

What is claimed is:

1. A miter saw comprising:
    a base for supporting a workpiece thereon, the base having a rotation center;
    a turntable supported by the base and rotatable about the rotation center;
    a cutting unit rotatably supporting a saw blade;
    a support unit provided to the turntable for pivotally movably supporting the cutting unit over the turntable; and
    a fixing mechanism associated with the base and the turntable to fix the turntable to the base, the fixing mechanism including an operation member operable by an operator for changing a state of fix or non-fix; wherein
    the turntable comprises:
        a main body provided with an outer periphery having a mount portion extending outwardly therefrom and an upper surface having an imaginary line onto which the saw blade is pivoted down, and
        an extension member supported on the mount portion and extending outwardly from the outer periphery in a first direction of the imaginary line for rotating the main body, the extension member having an upper portion substantially coplanar with the upper surface of the main body to support the workpiece thereon and the extension member being movable with respect to the mount portion to shorten the length of the miter saw in said first direction so that the miter saw can become compact when out of use compared with the miter saw in use,
    wherein the operation member of the fixing mechanism is provided to the mount portion, and
    wherein the fixing mechanism is able to change the state of fix or non-fix regardless of a movement of the extension member.

2. The miter saw as claimed in claim 1, wherein
    the extension member comprises a proximal-end portion facing the outer periphery and a distal-end portion in the first direction, and
    the mount portion movably supports the extension member, a distance between the proximal-end portion and the distal-end portion in the first direction depends on a posture of the extension member with respect to the main body.

3. The miter saw as claimed in claim 2, wherein the extension member is movable between a first position at which the extension member is immovably secured to the mount portion, and a second position at which a securement of the extension member to the mount portion is released.

4. The miter saw as claimed in claim 3, wherein the main body comprises a rotary shaft extending in a second direction perpendicular to the first direction and parallel to the upper surface, the extension member having an extension upper surface,
    the extension member is pivotably attached about the rotary shaft between the first position and the second position,
    the extension upper surface is flush with the upper surface when the extension member is at the first position.

5. The miter saw as claimed in claim 4, further comprising a positioning mechanism for fixing the extension member to the main body when the extension member is located at one of the first position and the second position.

6. The miter saw as claimed in claim 4, further comprising an angular adjusting mechanism associated with the extension member and the mount portion for adjusting a pivot angle of the extension member with respect to the main body.

7. The miter saw as claimed in claim 3, wherein
    the extension member is detachable to the mount portion,
    the extension member is located at the first position while the extending member is attached to the mount portion.

8. The miter saw as claimed in claim 2, the extension member is movable with respect to the mount portion in the first direction to change the distance in the first direction.

9. The miter saw as claimed in claim 1, wherein the fixing mechanism further comprises a plurality of engaged portions provided along an arc about the rotation center, and an engaging portion engageable with one of the plurality of engaged portions.

10. The miter saw as claimed in claim 1, wherein the support unit comprises a moving mechanism for moving the cutting unit in the first direction.

11. The miter saw as claimed in claim 10, wherein the support unit is positioned on an opposite side of the extension member with respect to the rotation center.

* * * * *